United States Patent
Dardona et al.

(10) Patent No.: US 10,717,229 B2
(45) Date of Patent: Jul. 21, 2020

(54) DIRECT WRITING OF CONFORMAL AND FREE-FORM MAGNETS

(71) Applicant: United Technologies Corporation, Farmington, CT (US)

(72) Inventors: Sameh Dardona, South Windsor, CT (US); Paul Sheedy, Bolton, CT (US); Wayde R. Schmidt, Pomfret Center, CT (US); Dustin D. Caldwell, Portland, CT (US); Slade R. Culp, Coventry, CT (US)

(73) Assignee: United Technologies Corporation, Farmington, CT (US)

( * ) Notice: Subject to any disclaimer, the term of this patent is extended or adjusted under 35 U.S.C. 154(b) by 345 days.

(21) Appl. No.: 15/722,829

(22) Filed: Oct. 2, 2017

(65) Prior Publication Data

US 2019/0099940 A1 Apr. 4, 2019

(51) Int. Cl.
| | |
|---|---|
| *B29C 64/129* | (2017.01) |
| *B33Y 10/00* | (2015.01) |
| *B33Y 70/00* | (2020.01) |
| *B33Y 80/00* | (2015.01) |
| *H01F 41/02* | (2006.01) |
| *H01F 1/00* | (2006.01) |
| *H01F 1/44* | (2006.01) |

(Continued)

(52) U.S. Cl.
CPC .......... *B29C 64/129* (2017.08); *B29C 64/106* (2017.08); *B33Y 10/00* (2014.12); *B33Y 70/00* (2014.12); *B33Y 80/00* (2014.12); *H01F 1/0027* (2013.01); *H01F 1/44* (2013.01); *H01F 41/0253* (2013.01); *H01F 41/16* (2013.01); *B29K 2105/16* (2013.01); *B29K 2505/00* (2013.01); *B29K 2995/0008* (2013.01)

(58) Field of Classification Search
CPC ............................ H01F 1/0027; H01F 1/0578
See application file for complete search history.

(56) References Cited

U.S. PATENT DOCUMENTS

| | | | | |
|---|---|---|---|---|
| 5,511,477 A | * | 4/1996 | Adler | ...................... B41C 1/003 |
| | | | | 101/128.4 |
| 6,391,393 B1 | * | 5/2002 | Martin | ...................... C08F 2/44 |
| | | | | 427/128 |

(Continued)

FOREIGN PATENT DOCUMENTS

| | | |
|---|---|---|
| DE | 3732116 A1 | 4/1988 |
| EP | 2955004 A1 | 12/2015 |

(Continued)

OTHER PUBLICATIONS

Translation of KR20020009725, Feb. 2, 2002*

(Continued)

*Primary Examiner* — C Melissa Koslow
(74) *Attorney, Agent, or Firm* — Kinney & Lange, P.A.

(57) ABSTRACT

A system for direct writing a conformal or free-form magnet includes producing a magnetic ink compound by mixing an photopolymer base and a magnetic material powder, extruding a layer of the magnetic ink compound through a nozzle on to a target substrate to form a layer, soft-curing the layer by exposing the layer to a first light, repeatedly extruding a layer and soft-curing the layer, then post-curing the magnet by exposing the magnet to a second light and an elevated temperature.

19 Claims, 3 Drawing Sheets

(51) Int. Cl.
    *H01F 41/16*     (2006.01)
    *B29C 64/106*     (2017.01)
    *B29K 105/16*     (2006.01)
    *B29K 505/00*     (2006.01)

(56) References Cited

U.S. PATENT DOCUMENTS

| | | | | |
|---|---|---|---|---|
| 9,527,992 | B2* | 12/2016 | Shulga | C08L 35/02 |
| 2002/0084439 | A1 | 7/2002 | Hart et al. | |
| 2004/0191572 | A1* | 9/2004 | Gao | C08K 3/08 |
| | | | | 428/692.1 |
| 2017/0054191 | A1 | 2/2017 | Williams | |
| 2017/0092400 | A1 | 3/2017 | Bharadwaj | |

FOREIGN PATENT DOCUMENTS

| | | | |
|---|---|---|---|
| KR | 20020009725 | * | 2/2002 |
| KR | 101664742 | * | 10/2016 |
| SU | 1315930 | * | 6/1987 |
| WO | 9320993 A | | 10/1993 |
| WO | WO 2016/202669 | * | 12/2016 |
| WO | 2017040156 A1 | | 3/2017 |

OTHER PUBLICATIONS

Translation of KR 101664742, Oct. 12, 2016.*

M. Parans Paranthaman, Christopher S. Shafer, Amy M, Elliott, Derek H, Siddel, Michael A. Mcguire, Robert M. Springfield, Josh Martin, Robert Fredette, and John Ormerod, Binder Jetting: A Novel NdFeB Bonded Magnet Fabrication Process, Nov. 7, 2016, 5 pages, JOM, vol. 68.

Extended European Search Report dated Mar. 21, 2019, received for corresponding European Application No. 18198295.0.

Herbst, Jan F., et al., "Relationships Between Crystal Structure and Magnetic Properties in Nd2Fe14B", Physical Review B, vol. 29, No. 7, Apr. 1, 1984, 4 pages.

Andreev, A.V. et al., "Magnetic properties of Y2Fe14B and Nd2Fe14B and their hydrides", Soviet Physics, Journal of Experimental and Theoretical Physics, vol. 63, No. 3, Mar. 1986, 5 pages.

Hughes, Scott, "Lecture 23: Magnetic Materials", Massachusetts Institute of Technology, Department of Physics, Spring 2005, 6 pages.

Lewis, Jennifer A., "Direct Ink Writing of 3D Functional Materials", Advanced Functional Materials, vol. 16, 2006, 12 pages.

Zhang, Y. et al., "Direct-write techniques for maskless production of microelectronics: a review of current state-of-the-art technologies", Institute of Electrical and Electronics Engineers, Aug. 2009, 9 pages.

Yi, P. P. et al., "Preparation and Properties of Anisotropic Nanocrystalline NdFeB Powders Made by Hydrogen Decrepitation of Die Upsetting Magnets", Journal of Physics: Conference Series 266, 2011, 6 pages.

Misra, Dr. Ajay, "Nano-Magnets and Additive Manufacturing for Electric Motors", 8th Annual CAFE Electric Aircraft Symposium, Apr. 25-26, 2014, 21 pages.

Ormerod, Dr. John, "Bonded Magnets: Current Status and Future Developments", The International Forum on Magnetic Applications, Technologies & Materials, Magnet Applications, Inc., Jan. 21-22, 2016, 47 pages.

Khan, Imran, "Electronic structure and magnetic properties of Nd2Fe14B", Journal—Korean Physical Society, Jun. 2016, 7 pages.

Wei, Min et al., "3D direct writing fabrication of electrodes for electrochemical storage devices", Journal of Power Sources 354, 2017, 14 pages.

"B—H Curve", Electronics and Micros, accessed Aug. 25, 2017, URL Link: http://www.electronics-micros.com/electrical/b-h-curve/ , 2 pages.

"Magnetic Field", Wikipedia.org, accessed Aug. 25, 2017, URL Link: https://en.wikipedia.org/w/index.php?title=Magnetic_field&oldid=797185822 , 23 pages.

"Neodymium magnet", Wikipedia.org, accessed Aug. 25, 2017, URL Link: https://en.wikipedia.org/w/index.php?titleNeodymium_magnet&oldid=794261633 , 8 pages.

"Sintered Neodymium Iron Boron (NdFeB) Magnets", Eclipse Magnetics Ltd., accessed Aug. 25, 2017, URL Link: http://www.eclipsemagnetics.com/media/wysiwyg/brochures/neodymium_grades_data.pdf , 32 pages.

Weickhmann, Michael et al., "Nd—Fe—B Magnets, Properties and Applications" Vacuumschmelze GmbJ & Co. KG, Hanau, Germany, accessed Aug. 25, 2017, 10 pages.

Saleem, Muhammad, "Study of Magnetic Features of Nd2Fe14B through the Spin Reorientation Transition by Magnetic Force Microscopy", Material Science, King Fahd University of Petroleum and Minerals, 2012, 68 pages.

Compton, Brett Gibson et al. "Direct-write 3D printing of NdFeB bonded magnets", Materials and Manufacturing Processes, Aug. 17, 2016, 6 pages.

* cited by examiner

DIRECT WRITING OF CONFORMAL AND FREE-FORM MAGNETS

BACKGROUND

The present disclosure relates generally to magnets, and more particularly, to a method of direct writing conformal and free-form magnets.

Magnets are typically used on rotors, shafts, and actuators to provide position indication to magnetic sensors that are positioned to detect the proximity, or the passing by, of those magnets. Magnetic position sensors that are based on magnets which are disposed on rotors, shafts, and actuators are widely used in automation and control systems, safety interlocks, and security systems. When used on rotating components, such as shafts and rotors, the magnets may be used to indicate shaft position, angular displacement, and/or rotational speed.

Magnets may be used in position sensors on rotors of motors, generators, and turbines for control systems that help improve the performance and efficiency of those devices. For optimum performance, magnets used on rotors, shafts, and actuators are as small as possible to fit within tight air gaps and/or to minimize their added volume and mass to a rotating system. Similarly, the magnetic flux density of the small magnets that are used in position sensing systems must be sufficiently high to affect the desired response from the magnetic detectors that are used in the position sensing system.

SUMMARY

According to one embodiment of the present disclosure, a system for direct writing of conformal and free-form magnets includes a magnetic ink compound comprised of a photopolymer resin base and a magnetic material powder.

According to another embodiment of the present disclosure, a system for direct writing of conformal and free-form magnets includes a process of extruding a filament of magnetic ink onto a target substrate to form an ink layer, soft-curing the ink layer, and repeatedly adding and soft-curing an ink layer to produce a green magnet, and then post-curing the green magnet to produce a magnet having an adequate structural strength.

DETAILED DESCRIPTION

Figure 1:
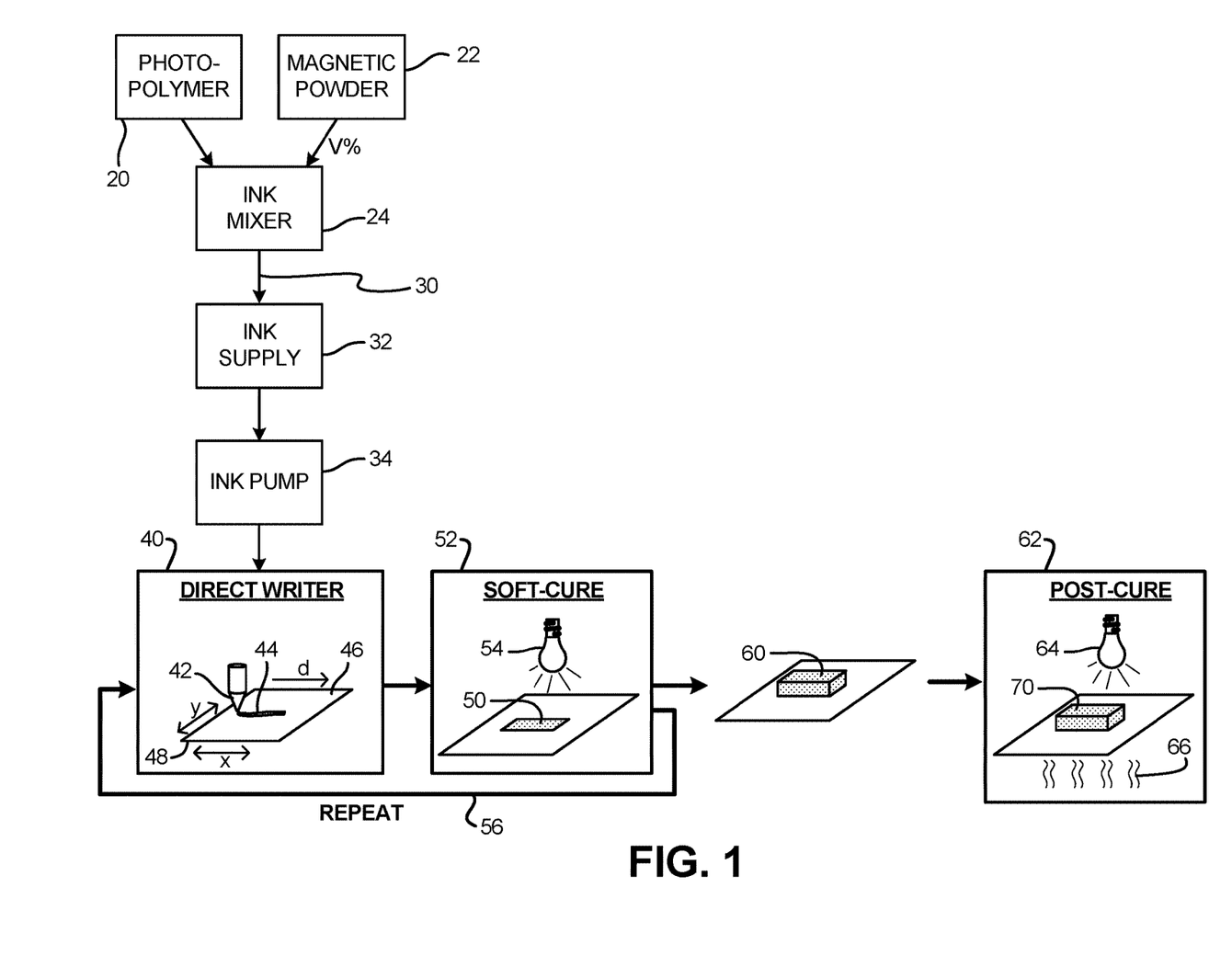
FIG. 1 is block diagram showing a process for direct writing of magnets using magnetic ink.

FIG. 1 is a block diagram depicting a process for direct writing of conformal and free-form magnets using magnetic ink. Shown in FIG. 1 are photopolymer 20, magnetic powder 22, ink mixer 24, magnetic ink compound 30, ink supply 32, ink pump 34, nozzle 42, ink filament 44, substrate 46, x-y movable platform 48, ink layer 50, first light exposure 54, green magnet 60, second light exposure 64, heat 66, and magnet 70. Also shown in FIG. 1 are the block diagrams for direct write 40, soft-cure 52, and post-cure 62, and the step for repeat 56.

In the illustrated embodiment, photopolymer 20 and magnetic powder 22 are mixed to form magnetic ink 30. As used in this disclosure, photopolymer 20 is a light-activated resin, also known as a photopolymer resin base, light-activated resin, and/or photoresin, which changes properties when exposed to light. A photopolymer that is optimized to respond to ultraviolet light is also known as a uv-curable resin. Photopolymer 20 may be comprised of monomers and/or oligomers, and photoinitiators (not shown), allowing photopolymer 20 to be soft and flowable in an uncured condition, which then becomes sufficiently viscous or solid as a result of the cross-linking of the monomers and/or oligomers during the light-activating process. The process of photopolymer 20 becoming more viscous or solidifying is also known as curing. Photopolymer 20 cures by the action of photoinitiators within photopolymer 20 absorbing the photon energy during exposure to light of a particular wavelength or range of wavelengths. As photopolymer 20 cures, it becomes sufficiently viscous or solid, while also bonding to any solid material photopolymer 20 is in contact with. In an embodiment, photopolymer 20 may be selected to be responsive to ultraviolet light having a wavelength of about 100-425 nm. In the illustrated embodiment, photopolymer 20 may be selected to be responsive to ultraviolet light having wavelengths of about 365-405 nm. Ultraviolet light sources of 365 nm and 405 nm wavelengths may be commercially available and readily adaptable to the process of the present disclosure. Because photopolymer 20 cures when photon energy acts on photoinitiators within photopolymer 20, any exposure to light may initiate the curing process. Visible light may initiate the curing process, particularly the shorter wavelengths of visible light near the violet end of the visible light spectrum.

In an alternate embodiment, photopolymer 20 may be sensitive to visible light, while taking precautions to avoid prematurely exposing photopolymer 20 to visible light, thereby leading to viscofication or solidification of photopolymer 20 earlier than may be desired. Examples of precautions taken with photopolymer 20 may include handling photopolymer 20 in a darkened environment, or using photopolymer 20 under darkroom safelights such as those having a wavelength near the red end of the visible light spectrum.

In some embodiments, photopolymer 20 may also be responsive to an elevated temperature for initiating the curing process. Higher temperatures may accelerate the curing rate of photopolymer 20, with a temperature of about 70° C. (158° F.) resulting in a noteworthy rate of curing. Temperatures ranging from about 55° C. (131° F.) to about 85° C. (185° F.) may be used to effectuate a noteworthy rate of curing of photopolymer 20.

In the illustrated embodiment, magnetic powder 22 is combined with photopolymer 20 in ink mixer 24 to produce magnetic ink 30. Magnetic powder 22 may be a powder made from an alloy of hard magnetic material. A hard magnetic material has the ability to retain a magnetic flux density B after being exposed to a magnetic field strength H. Alloys of NdFeB, NdFeBH, YFeB, and YFeBH are non-limiting examples of materials that have an ability to maintain a relatively strong residual magnetic flux density B. In a particular embodiment, an alloy of nominal composition $Nd_2Fe_{14}B$ has a crystalline metallic structure that is capable of retaining a particularly strong magnetic flux density B after being exposed to a magnetic field strength H.

In some embodiments, magnetic powder 22 may be comprised of alloy particles having a mean effective diameter, on a volume basis, of approximately 20 μm. Typical manufacturing processes for magnetic powder 22 produces particles that are approximately spherical in shape, however, particles may be elongated or have a flattened surface or other surface features. Effective diameter refers to the diameter of a resulting sphere equivalent of a specific particle as if it were formed in a spherical shape, and mean effective diameter refers to the population mean of a sample of particles. Typical manufacturing processes for magnetic powder 22 produces particles that are approximately equal in size, whether as a result of a particular manufacturing process or a result of a grading process that occurs following a manufacturing process for magnetic powder 22. Magnetic powders 22 being comprised of particles of different compositions, particle sizes, and/or particle shapes are also within the scope of this disclosure.

In some embodiments, magnetic powder 22 may be comprised of alloy particles having a mean effective diameter, on a volume basis, between approximately 1 µm and 30 µm.

In some embodiments, photopolymer 20 and magnetic powder 22 are combined in a proportion that yields magnetic ink 30 wherein magnetic powder 22 comprises approximately 45% by volume solid loading (v %). A volume solid loading v % of approximately 45% produces magnetic ink 30 having the consistency of a paste that is capable of being extruded when forced through a nozzle.

In some embodiments, the volume solid loading v % may range between 10% and 85%. In determining the optimum value of volume solid loading v % of magnetic ink 30, a lower value of volume solid loading v % results in a more fluid magnetic ink 30 and stronger post-cure bond strength. Alternatively, a higher value of volume solid loading v % results in a stronger magnetic flux density B because of the greater volume density of magnetic powder 22. The material properties of photopolymer 20 and the magnetic and physical properties of magnetic powder 22 enable the adjustment of the value of volume solid loading v % to obtain the desired results for a particular embodiment. Additionally, the desired magnetic flux density B of magnet 70 helps determine volume solid loading v % in a particular embodiment.

In the illustrated embodiment, ink mixer 24 combines photopolymer 20 and magnetic powder 22 in a specified ratio to produce magnetic ink 30 having volume solid loading v %. Ink mixer 24 produces an approximately uniform dispersion of magnetic powder 22 throughout photopolymer 20 to produce magnetic ink 30. Those who are skilled in the art of combining resins are familiar with various methods that may be used to combine photopolymer 20 and magnetic powder 22, including, without limitation, mixing, dispersing, stirring, blending, folding, spinning, vibrating, agitating, and masticating. Magnetic ink 30, after being produced in the method of the present disclosure, becomes ink supply 32.

Magnetic ink 30 held as ink supply 32 will maintain an approximately uniform distribution of magnetic powder 22 throughout photopolymer 20 for a period of time that may be sufficient to allow magnetic ink 30 to be used as described within this disclosure. Over time, particles of magnetic powder 22 in ink supply 32 may stratify, because of the force of gravity acting upon particles of magnetic powder 22. The period of time during which an approximately uniform distribution of magnetic powder 22 throughout photopolymer 20 may range from a few minutes to several days or more, and will vary depending on several factors including, without limitation, the particular type of photopolymer 20 being used, the temperature of ink supply 32, the alloy being used for magnetic powder 22, the shape and size of the particles that comprise magnetic powder 22, and the volume solid loading v % of magnetic powder 22.

In some embodiments, ink mixer 24 may produce a volume of magnetic ink 30 for ink supply 32 that is sufficient for producing one magnet 70 by means of the present disclosure. In another embodiment, ink mixer 24 may produce a larger volume of magnetic ink 30 for ink supply 32 that is sufficient to produce a plurality of magnets 70 by means of the present disclosure. Particles of magnetic powder 22 in ink supply 32 may become stratified over time, as described earlier. If stratification of magnetic powder 22 in magnetic ink 30 stored in ink supply 32 occurs, magnetic ink 30 may be returned to ink mixer 24. Stratification may be difficult to assess without analytical means. Therefore, guidelines for the shelf life of ink supply 32 may be established based on experiments that are conducted for a particular formulation of magnetic ink 30 and storage conditions of ink supply 32.

In some embodiments, ink mixer 24 may operate continuously, producing magnetic ink 30 that flows intermittently or continuously to ink supply 32 for use in producing magnets 70 in accordance with the present disclosure. The intermittent or continuous flow of magnetic ink 30 to ink supply 32 may be used in a manufacturing facility, for example, on an assembly line, where a plurality of magnets 70 are produced as an intermittently or continuously running manufacturing process.

Ink pump 34 receives magnetic ink 30 from ink supply 32 and discharges magnetic ink 30 at controlled pressures to direct writer 40. In an embodiment, ink pump 34 may be a positive displacement pump. Ink pump 34 may be a cylinder (not shown) that contains magnetic ink 30, with a piston (not shown) at one end and a fluid connection to direct writer 40 at the other end. In an embodiment, air pressure, hydraulic pressure, spring pressure, or any other suitable source of force or pressure may be applied to the piston to apply force to magnetic ink 30 in the cylinder. In an embodiment, particularly where a small volume of magnetic ink 30 is to be used, the cylinder and piston of ink pump 34 may be a syringe (not shown).

In some embodiments, particularly in a manufacturing facility, such as on an assembly line, ink pump 34 may be a continuously operating pump that provides a continuous flow of magnetic ink 30 to direct writer 40. Ink pump 34 may be a positive displacement pump, such as a screw, gear, diaphragm, or piston positive displacement pump. Those who are skilled in the art of pumping pastes and other highly viscous compounds are familiar with methods that may be used for ink pump 34.

In the illustrated embodiment, direct writer 40 is comprised of nozzle 42 and x-y movable platform 48. Ink pump 34 is fluidly connected to nozzle 42 to deliver magnetic ink 30 to nozzle 42. Nozzle 42 produces ink filament 44 when magnetic ink 30 is forced under pressure by ink pump 34 through nozzle 42. Ink filament 44 attaches to substrate 46 that is held in position on x-y movable platform 48. As ink filament 44 is produced, x-y movable platform 48 moves in direction d that results in ink filament 44 lying on substrate 46. x-y movable platform 48 moves at a rate approximately equivalent to the rate ink filament 44 is extruded from nozzle 42, thereby allowing ink filament 44 on substrate 46 to retain the approximate shape and size of ink filament 44 as ink filament 44 extrudes from nozzle 42. The cross-sectional shape of ink filament 44 is determined by the cross-sectional shape of nozzle 42, which may be round, square, rectangular, cruciform, or any other shape.

In some embodiments, if x-y moveable platform 48 moves at a rate faster than ink filament 44 extrudes from nozzle 42, then the resulting size of ink filament 44 on substrate 46 may be thinner than ink filament 44 as ink filament 44 extrudes from nozzle 42. Alternatively, if x-y moveable platform 48 moves at a rate slower than ink filament 44 as ink filament 44 extrudes from nozzle 42, then the resulting size of ink filament 44 on substrate 46 may be thicker than ink filament 44 as ink filament 44 extrudes from nozzle. Finally, if x-y moveable platform 48 moves very slowly, or is stationary in the x-y plane, then ink filament 44 may take on the form of a globule. All embodiments of depositing magnetic ink 30 from nozzle 42 onto substrate 46 are within the scope of the present disclosure.

In some embodiments, nozzle 42 may have a diameter of 200 μm-300 μm, resulting in ink filament 44 having approximately the same diameter of 200 μm-300 μm. As used in this disclosure, diameter of nozzle 42 refers to the diameter of the opening at the discharge of nozzle 42, a dimension which has the dominant effect on the diameter of ink filament 44. Use of a smaller diameter for ink filament 44 may result in a stronger curing process, and greater dimensional control of the finished magnet 70 may be achieved, however a greater period of time may be needed for producing magnet 70 of a specified dimension, as compared to using a larger diameter for ink filament 44. These are among the factors to be considered when selecting the size for nozzle 42 in a particular embodiment.

In some embodiments, the diameter of nozzle 42 may be smaller than 200 μm, or larger than 300 μm. Use of smaller diameters of nozzle 42 may be beneficial for producing a conformal magnet 70 on a shaft that may later rotate in operation, for example, where it may be desirable that magnet 70 is as small as possible. Moreover, a smaller diameter for nozzle 42 may enable a greater magnetic flux density B in magnet 70 (described later, in FIG. 3). Conversely, larger diameters of nozzle 42 may be beneficial for producing a larger free-form magnet 70 where feature size control is not as critical, or where the value of magnetic flux density B may not need to be as great. In referring to the size of nozzle 42, the measure of diameter is used in this disclosure. However, the term is not meant to limit the nozzle shape to one that is round. The cross-sectional shape of nozzle 42 may be round, square, rectangular, cruciform, or any other shape. Therefore, diameter refers to the effective cross-sectional size of nozzle 42.

In the illustrated embodiment, nozzle 42 includes an internal valve (not shown) that opens or closes to allow, or to stop, the flow of magnetic ink 30 from nozzle 42. In an embodiment, the internal valve may be a needle valve. In another embodiment, any other type of valve that is suitable for opening and closing to control the flow of magnetic ink 30 may be used, whether the valve is internal or external to nozzle 42.

In the illustrated embodiment, nozzle 42 is moveable along the z-axis, allowing nozzle 42 to move up, or down, in the direction away from, or toward, substrate 46. During operation of direct writer 40, ink layer 50 is produced by the systematic movement of x-y movable platform 48 as ink filament 44 extrudes from nozzle 42. Ink filament 44 is deposited on substrate 46, having a width and forming a length of ink filament 44 that represents the desired length of finished magnet 70. The internal valve on nozzle 42 opens and closes, as required, to define the length of ink filament 44 on substrate 46. After the first width and length of a first ink filament 44 is produced, moveable x-y platform 48 repositions to align nozzle 42 in the desired position along a first ink filament 44 so that a second ink filament 44 will be produced. In a repeated operation, the first ink filament 44 may be referred to as a previous ink filament 44, and the second ink filament 44 may be referred to as a new ink filament 44. The process of producing a new ink filament 44 alongside a previous ink filament 44 may continue until ink layer 50 is produced having the desired width and length. The lateral distance between the proximate edges of a previous ink filament 44 and a new ink filament 44 may be zero, meaning that previous ink filament 44 and new ink filament 44 contact each other. In some embodiments, this lateral distance may be greater than zero, resulting in both edges of each ink filament 44 being exposed, thereby enabling a stronger curing (described later).

In some embodiments, direct writer 40 may deposit one or more short lengths of ink filaments 44 in a line, instead of depositing a continuous length of ink filament 44. In some embodiments, a single point of magnetic ink 30 may be deposited, with a single point of magnetic ink 30 comprising filament 44. In this embodiment, the length of filament 44 is approximately equal to the width of filament 44, with a shape that may be approximately round. A point of magnetic ink 30 so formed may also be referred to as a dot of magnetic ink 30. The size of a point of magnetic ink 30 that is deposited may range from approximately the diameter of nozzle 42 up to a substantially larger globule of magnetic ink 30. In some embodiments, direct writer 40 may produce ink layer 50 being comprised of a pattern of short line segments, arcs, and/or dots of magnetic ink 30. In some embodiments, complex patterns being comprised of a plurality of dots of magnetic ink may be extruded on to substrate 46, thereby producing ink layer 50.

In the illustrated embodiment, after ink layer 50 is produced by direct writer 40, ink layer 50 must undergo soft-cure 52. In soft-cure 52, ink layer 50 is exposed to first light exposure 54. In an embodiment, first light exposure 54 has a wavelength of 365-405 nm. During soft-cure 52, ink layer 50 is exposed to first light exposure 54 for a period of time that is sufficient to cure ink layer 50 such that ink layer 50 becomes structurally rigid, being at least sufficiently viscous, or solid, as required in a particular embodiment. The purpose for ink layer 50 being structurally rigid is to support the placement of a subsequent ink layer 50 upon a previous ink layer 50, while maintaining the desired structure of magnet 70. For a given formulation of magnetic ink 30, the period of time required for soft-cure 52 depends primarily on the intensity of first light exposure 54, with a shorter time being possible for a higher intensity of first light exposure 54. The period of time required for soft-cure 52 also depends on the diameter of ink filament 44, and accordingly, the resulting thickness of ink layer 50, with a shorter time being possible for a smaller diameter for ink filament 44. The period of time required for soft-cure 52 may also depend on several other factors, including, without limitation, the material properties of photopolymer 20 being used, the volume solid loading v % of magnetic powder 22 in magnetic ink 30, the wavelength and/or intensity of first light exposure 54, the ambient temperature of ink layer 50 during soft-cure 52, the optical density and/or absorption of magnetic ink 30, and the resulting desired value of magnetic flux density B in completed magnet 70. By providing a greater degree of curing for each ink layer 50, a greater value of magnetic flux density B may be created in magnet 70 (described later, in FIG. 3). Accordingly, a lateral spacing greater than zero between previous ink filament 44 and next ink filament 44 may expose more surface area of ink filaments 44 to first light exposure 54 during soft-cure 52, thereby allowing a greater value of magnetic flux density B to be produced in magnet 70. If a non-zero lateral spacing between ink filaments 44 is used on ink layer 50, then the next ink layer 50 that is produced will fill in the gaps between ink filaments 44 of the previous ink layer 50, thereby resulting in a solid structure being produced for the finished magnet 70. Generally speaking, the period of time for soft-cure 52 may range from a fraction of a second to several minutes or longer.

In some embodiments, first light exposure 54 may have a wavelength 100-425 nm. In other embodiments, first light exposure 54 may have a wavelength shorter than 100 nm, or longer than 425 nm. If the wavelength of first light exposure 54 is greater than approximately 425 nm, then photopolymer 20 being used is sensitive to visible light. Accordingly, as noted earlier, precautions should be taken to avoid prematurely exposing magnetic ink 30 to visible light.

In some embodiments, soft-cure 52 may be integrated in direct writer 40 by providing continuous exposure of first light exposure 54 as ink filament 44 is extruded from nozzle 42 onto substrate 46 (or onto previous ink layer 50, as described earlier). This may be described as cure-while-write, and may be optimized for use in producing ink layer 50 in a relatively fast manner.

In the illustrated embodiment, soft-cure 52 occurs after ink layer 50 is produced by direct writer 40. This may be accomplished by moving ink layer 50 away from nozzle 42 by moving x-y movable platform 48, thereby positioning ink layer 50 in proximity to first light exposure 54. In some embodiments, direct writer 40 may remove nozzle 42 from ink layer 50, thereby allowing first light exposure 54 to illuminate ink layer 50.

After soft-cure 52 is performed, repeat process step 56 is invoked, to deposit a subsequent ink layer 50 on previous ink layer 50. Repeat process step 56 may occur for a number of times that is necessary for direct writer 42 to produce consecutive ink layers 50, one atop the previous, until the desired height of finished magnet 70 is produced. In some embodiments, ink layers 50 may be solid, thereby producing a solid form that may represent any geometric shape, without limitation.

In other embodiments, a magnetic pattern may be formed being comprised of a series of ink filaments 44 having the appearance of line segments, arcs, and/or dots of magnetic ink 30. In some embodiments, the magnetic pattern may be intricate, having minimum feature sizes being approximately equal to the diameter of nozzle 42. In some embodiments, a magnetic pattern having a height in the z-direction may be produced by direct writer 40 by the repeated extrusion of a new ink layer 50 above a previous ink layer 50. Those who are skilled in the art of additive manufacturing are familiar with the techniques that may be employed to produce a subsequent ink layer 50 that may be slightly different in shape or size to previous ink layer 50, or which may contain surface discontinuities, thereby allowing for the production of intricate three-dimensional shapes by direct writer 40. All techniques for controlling direct writer 40 to produce magnets 70 of any three-dimensional configuration are within the scope of the present disclosure.

In the illustrated embodiment, after the final ink layer 50 is produced by direct writer 40, the product is green magnet 60. Green magnet 60 and accompanying substrate 46 may be removed from direct writer 40. At this point, green magnet 60 is structurally sound as a result of soft-cure 52 that were performed after each successive ink layer 50 was produced. However, green magnet 60 must undergo post-cure 62 for the sufficient cross-linking of the monomers and/or oligomers within photopolymer 20 to occur, and for the proper bonding of photopolymer 20 to the particles of magnetic powder 22 to occur. If a conformal magnet 70 is being produced by direct writer 40, then green magnet 60 remains bonded to substrate 46. In this case, for example, substrate 46 may be a shaft, rotor, stator, actuator, or other component of a machine, device, or apparatus. Alternatively, if a free-form magnet 70 is being produced by direct writer 40, then green magnet 60 is removed from substrate 46.

In the illustrated embodiment, whether magnet 70 will be a conformal magnet or a free-form magnet, post-cure 62 includes exposing green magnet 60 to second light exposure 64 while also applying heat 66 to hold green magnet 60 at an elevated temperature for a specified period of time. In an embodiment, second light exposure 64 has a wavelength of about 365-405 nm, and the elevated temperature is approximately 70° C. (158° F.). The period of time required for post-cure 62 depends on several other factors, including, without limitation, the overall size and shape of green magnet 60, the material properties of photopolymer 20 being used, the shape and size of the particles of magnetic powder 22, the volume solid loading v % of magnetic powder 22 in magnetic ink 30, the wavelength and/or intensity of second light exposure 64 being used, the degree of curing that occurred during soft-cure 52, and the resulting desired magnetic flux density B of magnet 70. The period of time for post-cure 62 may range from several minutes to several hours. In some embodiments, the time for post-cure 62 may be greater than several hours, and possibly several days or longer.

In some embodiments, second light exposure 64 may have a wavelength between about 100-425 nm, and the elevated temperature may range from about 55° C. (131° F.) to 85° C. (185° F.). In yet another embodiment, second light exposure 64 may have a wavelength shorter than 100 nm, or longer than 425 nm, and the elevated temperature may be lower than 55° C. (131° F.) or higher than 85° C. (185° F.). The period of time for post-cure 62 may range from a few seconds to more than one day.

In yet another embodiment, post-cure 62 may consist of exposing green magnet 60 to second light exposure 64 while not applying heat 66 to green magnet 60. Absorption of the photon energy of second light exposure 64 by green magnet 60 may result in an elevated temperature of green magnet 60, with a greater elevated temperature resulting from a higher intensity second light exposure 64. Alternatively, post-cure 62 may include applying heat 66 to green magnet 60 to hold the temperature of green magnet 60 at an elevated temperature for a specified period of time, while not exposing green magnet 60 to second light exposure 64. Various combinations of second light exposure 64 and heat 66, and various time profiles of second light exposure 64 and heat 66, including all values of wavelength and intensity for second light exposure 64, and all values temperature for heat 66, are within the scope of the present disclosure.

After magnet 70 is produced using the process of the present disclosure, magnet 70 is exposed to a magnetic field (not shown) having a vector in magnitude and direction that will induce a resulting magnetic flux density B in magnet 70. This occurs by the magnetic field strength H aligning the magnetic domains within the crystalline metallic structure of the alloy that comprises the particles of magnetic powder 22 in a particular orientation within the cured structure of magnet 70. After removing the magnetic field, the magnetic domains within the crystalline metallic structure of the alloy that comprises the particles of magnetic powder 22 retain a residual magnetic flux density B. Accordingly, magnet 70 retains residual magnetic flux density B. In some embodiments, a magnetic field may be applied prior to or during post-cure 62. In some embodiments, a magnetizing field may be applied during soft-cure 52. In some embodiments, a magnetizing field may be integrated into direct writer 40. Those who are skilled in the art of hard magnets are familiar with the various means that may be used to induce a residual magnetic flux density B within hard magnetic material, such as magnet 70 produced using the process of the present disclosure.

In an embodiment, magnet 70 produced using the process of the present disclosure may be used as part of a position-sensing apparatus by placing one or more magnetic sensors (not shown) near a point along the movement of magnet 70. If used on a shaft, rotor, or stator, magnet 70 (or a magnetized portion of magnet 70) may be used to induce a response in a magnetic sensor, for example, on every passing of magnet 70 past the magnetic sensor. The magnetic sensor may be an inductive head in which a voltage is induced as magnetic flux density B passes through it, as a result of the relative motion between magnet 70 and the magnetic sensor. Alternatively, the magnetic sensor may be a magnetic reed switch which either opens or closes in the presence of a magnetic field. Moreover, the magnetic sensor may be a magnetoresistive element that changes its electrical resistance in the presence of a magnetic flux. Those who are skilled in the art of magnetic position sensors are familiar with different means of using magnetoresistive (MR) sensors to detect magnetic field location including, without limitation, giant magnetoresistance (GMR), tunnel magnetoresistance (TMR), colossal magnetoresistance (CMR), and extraordinary magnetoresistance (EMR). Other types of magnetic sensors may also be used with the directly written free-form and conformal magnets, and are within the scope of this disclosure.

The direct writing process of the present disclosure generally involves a relative motion between nozzle 42 and substrate 46. In some embodiments, a relative motion may be continuous, such as for the extrusion of segments of ink filament 44. In some embodiments, a relative motion may be intermittent, such as for the extrusion of points or globules of magnetic ink 30 to form ink filament 44, with a second ink filament 44 being in spatial proximity to a first ink filament 44 as a result of the intermittent relative motion between nozzle 42 and substrate 46.

In some embodiments, substrate 46 may be affixed to an x-y-z movable platform (not shown) that moves in three perpendicular axes of motion to produce ink layer 50, and accordingly, green magnet 60. In this alternative embodiment, nozzle 42 may be fixed in position, allowing for motion to produce green magnet 60 to take place by an x-y-z movable platform.

In some embodiments, substrate 46 may be fixed in position and nozzle 42 may be affixed to an x-y-z moveable platform (not shown), being used to move nozzle 42 in three axes to produce green magnet 60. Moreover, in other embodiments, nozzle 42 may be affixed to a robotic arm (not shown) that is controlled in 3-, 4-, 5-, or greater than 5-axes of motion. This latter embodiment may be particularly adaptable to direct writing conformal magnet 70 on a three-dimensional or irregularly-shaped substrate 46, including, for example, in situ where substrate 46 exists as a component or a part of an existing piece of equipment upon which it is desired to produce a conformal magnet 70 thereupon.

Figure 2:
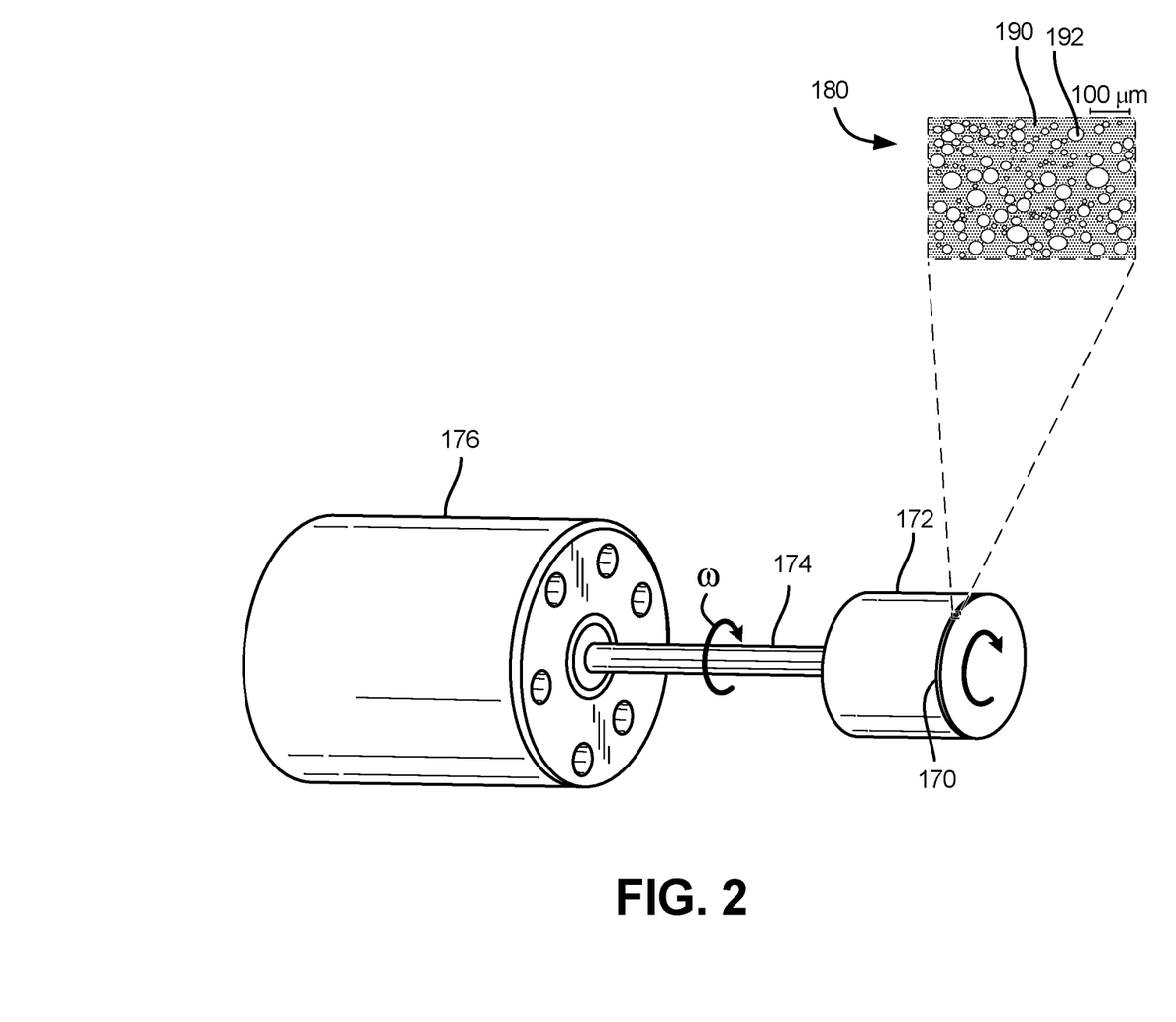
FIG. 2 is a perspective view of a direct-written conformal magnet on a rotor, with an enlargement of the magnet structure.

FIG. 2 is a perspective view of a direct-written conformal magnet on a rotor, with an enlargement of the internal structure of magnet. Shown in FIG. 2 is conformal magnet 170, rotor 172, shaft 174, and motor 176, with the enlargement showing composite magnet 180, cured photopolymer 190, and a plurality of magnetic particles 192.

In the illustrated embodiment, conformal magnet 170 was produced by the direct writing process of the present disclosure, with conformal magnet 170 being located along the outer circumference of rotor 172. Motor 176 has shaft 174 which is directly attached to rotor 172. Therefore, when motor 176 rotates with rotational speed w, shaft 174 and rotor 172 also rotate with rotational speed w. The enlargement is a cross-sectional view taken of a slice of cured composite magnet 180, depicting a plurality of magnetic particles 192 disposed within cured photopolymer 190. Magnetic particles 192 are approximately randomly distributed in three axes throughout cured composite magnet 180, therefore the plane of the cross-sectional view is irrelevant. In an embodiment, each magnetic particle 192 is approximately spherical in shape while having a mean effective diameter of approximately 20 μm. Some magnetic particles 192 may be larger than others. Similarly, magnetic particles 192 may have various shapes, including being elongated or having a flattened surface or other surface features. Cured photopolymer 190 provides the structural strength for conformal magnet 170, while also holding magnetic particles 192 within cured photopolymer 190 to comprise composite magnet 180. Cured photopolymer 190 also forms a bond to the surface of rotor 172 as depicted, with the surface of rotor 172 being substrate 46 in FIG. 1. Cured photopolymer 190 also bonds to the surface of each of the plurality of magnetic particles 192, preventing the rotation of magnetic particles 192. Without a bond between cured photopolymer 190 and magnetic particles 192, magnetic particles 192 may be induced to rotate in the presence of an applied magnetic field because magnetic particles 192 have an approximately spherical shape. Any rotation of magnetic particles 192 within cured composite magnet 180 may tend to degrade the magnetic flux density B of conformal magnet 170.

The illustrated embodiment depicts rotor 172 rotating with conformal magnet 170 on the outer circumference of rotor 172, which may be useful for a demonstration of the present embodiment. In another embodiment, conformal magnet 170 may be on a shaft, rotor, turbine tip, or any other component on a rotating or stationary assembly. One or more conformal magnets 170 may be disposed on moving or rotating components, and one or more conformal magnets 170 may also be disposed on stationary components. Moreover, a plurality of conformal magnets 170 may be disposed on an actuator, position detector, or other component, and one or more magnetic sensors (not shown) may be disposed near the range of motion of the conformal magnets 170 to form a position sensing network.

In some embodiments, conformal magnet 170 may have a magnetic domain written at a point along the circumference of conformal magnet 170, which the magnetic sensor (not shown) would detect at every passing during the rotation of rotor 172. In some embodiments, a series of magnetic domains (and corresponding magnetic flux reversals) may be written along the circumference of conformal magnet 170, allowing one or more magnetic sensors (not shown) to detect multiple angular positions of rotor 172. A magnetic pattern may be encoded along the surface of conformal magnet 170, with the magnetic pattern corresponding to bytes of data that may be read by a magnetic sensor. In some embodiments, conformal magnet 170 may be comprised of a series of magnetic features or pattern of short line segments, arcs, and/or dots of magnetic ink 30. A magnetic pattern may be encoded upon the various magnetic features so formed. Those who are skilled in the art of magnetic rotor position sensors are familiar with various means that may be employed to detect rotor identification and positon, and from it, to calculate rotor speed, acceleration, vibration, and other parameters.

In other embodiments, one or more conformal magnets 170 may be directly written on shafts, actuators, and other components of machinery, instrumentation, and control systems, with potentially no limit to the possibilities that may result in the use of directly written free-form and conformal magnets 170. There are many distinct advantages of directly written magnets of the present disclosure over magnets of the prior art. Material waste and scrap is minimized by using the additive manufacturing process of the present disclosure. The size, and particularly the thickness, of directly written conformal magnets on rotating components is significantly less than those of the prior art. The reduced size and weight thereby reduces mass and inertia that is added to a rotating component, with this benefit being greater for higher rotational speeds. Directly writing a magnetic ink 30 to a rotor, for example, allows the surface of the rotor to be substrate 46, thereby allowing a physical bond to occur between magnetic ink 30 and substrate 46. This may have a distinct advantage of eliminating the otherwise additional step of attaching a magnet to a rotor, as may be performed in the prior art. Directly writing magnets 170 to the surface of a component utilizing the method of the present disclosure may allow extremely intricate and complex magnetic patterns to be written upon substrate 46, which may be beneficial in complex control systems and which may also be used in security systems where the surface magnetic pattern is not easily seen or discerned.

In some embodiments, the direct writing process of the present disclosure allows for small magnets 170 to be written onto the surface of very small components, allowing for miniaturizing that is beyond the scope of utilizing discrete magnets to occur. The feature size of a directly written conformal magnet may be as small as the diameter of the nozzle that is used to produce it, for example, 200 μm or smaller, depending on the size of nozzle 42, as in the present disclosure. In some embodiments, the direct writing of very small magnets 170 may provide embodiments in Micro-Electro-Mechanical Systems (MEMS), where miniaturized motors, generators, and position sensors may be produced by the method of the present disclosure. Moreover, the direct writing process of the present disclosure may be used to produce security devices, such as magnetic keys and keycards, or to provide an additional security feature onto an existing key or keycard.

Figure 3:
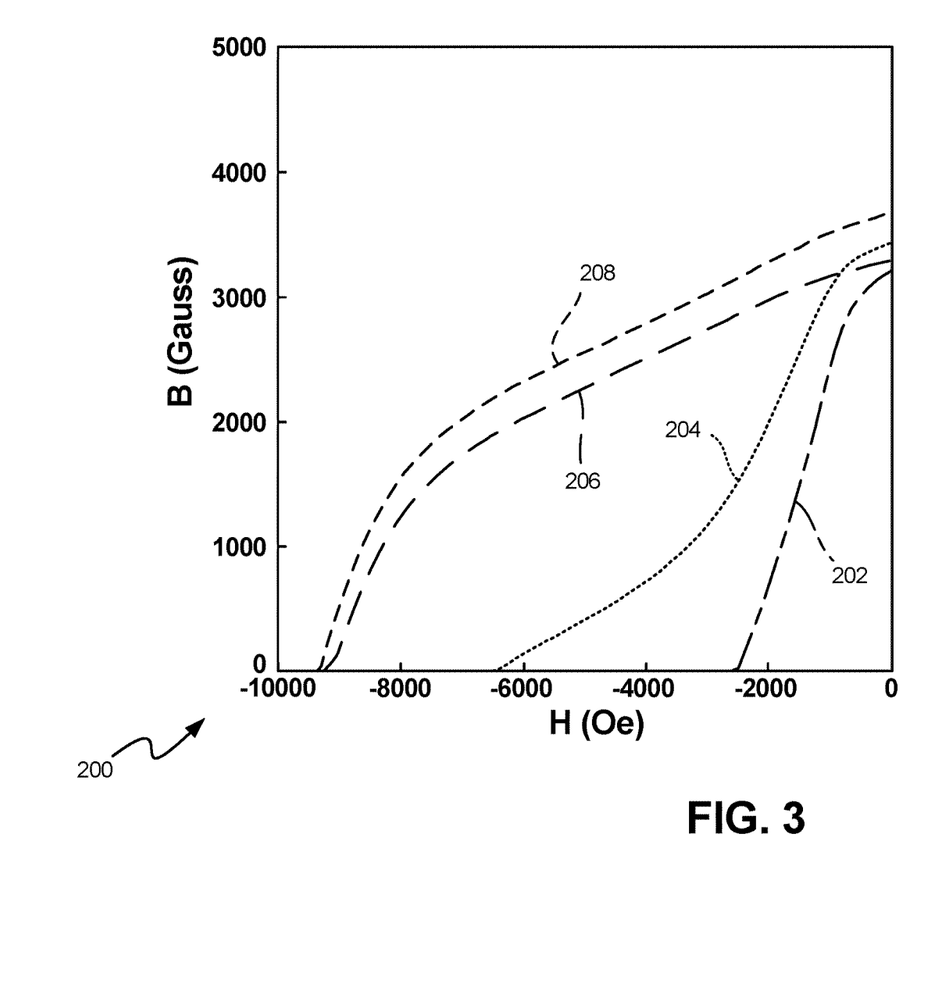
FIG. 3 is a graph showing B-H curves for the direct-written magnets under varying manufacturing conditions.

Finally, referring to FIG. 3, graph 200 depicts coordinate axes of magnetic flux density B (in Gauss) vs. magnetic field strength H (in Oersteds). Shown in FIG. 3 are B-H curves that were experimentally determined for the following values of uv light wavelength and ink layer thickness:

365 nm uv light on 300 μm ink layer 202
365 nm uv light on 200 μm ink layer 204,
405 nm uv light on 300 μm ink layer 206, and
405 nm uv light on 200 μm ink layer 208.

In obtaining the results depicted in FIG. 3, two different nozzle sizes were used (300 μm and 200 μm), and two different wavelengths of light were used (365 nm and 405 nm). In the evaluation depicted in FIG. 3, magnetic ink 30 was produced using photopolymer 20 having a particular sensitivity to ultraviolet (uv) light. Therefore, the two wavelengths of light that are depicted (365 nm and 405 nm) may both be referred to as uv light. Finally, the wavelength of light that is depicted in each of the four curves was used for both first light exposure 54 during soft-cure 52 and second light exposure 64 during post-cure 62 as described in FIG. 1. The elevated temperature resulting from heat 66 used during post-cure 62 was 70° C. (158° F.). The time duration used for each step in soft-cure 52 was the same in each experiment, and the time duration used for post-cure 62 was the same in each experiment.

In the experimental results disclosed, comparing 365 nm uv light on 300 μm ink layer 202 to 365 nm uv light on 200 μm ink layer 204, a greater magnetic flux density B results from using a nozzle 42 with a smaller size, thereby resulting in a smaller filament 44 and a thinner ink layer 50. This is explained by the thinner ink layer 50, being 200 μm, allowing a greater penetration of the uv light into ink layer 50 during soft-cure 52, thereby creating a stronger bond between cured photopolymer 190 and magnetic particles 192 throughout composite magnet 180 as depicted in FIG. 2. The stronger bond between cured photopolymer 190 and magnetic particles 192 reduces the rotation of magnetic particles 192 when subjected to magnetic field strength H, thereby resulting in a greater magnitude of a magnetic flux density B.

A description similar to the preceding paragraph may be used to explain the comparison of the 405 nm uv light on 300 μm ink layer 206 to 405 nm uv light on 200 μm ink layer 208, resulting in a greater magnetic flux density B from the smaller nozzle 42.

In the experimental results disclosed, comparing 365 nm uv light on 300 μm ink layer 202 to 405 nm uv light on 300 μm ink layer 206, a greater magnetic flux density B results from using the longer wavelength (405 nm) of uv light during soft-cure 52 and post-cure 62. This is explained by magnetic ink 30 having been made using photopolymer 20 that was optimized for the longer wavelength (405 nm) uv light, thereby creating a stronger bond between cured photopolymer 190 and magnetic particles 192. A description similar to the preceding paragraph may be used to explain the comparison of the 365 nm uv light on 200 μm ink layer 204 to 405 nm uv light on 200 μm ink layer 208, resulting in a greater magnetic flux density B from the longer wavelength uv light.

In other embodiments, photopolymer 20 having a particular sensitivity to other wavelengths of light may be used, thereby allowing the greatest curing to result when the optimized wavelength of light is used for soft-cure 52 and/or post-cure 62. In some embodiments, photopolymer 20 having broadband light sensitivity may be used. For example, photopolymer 20 may have broadband sensitivity to uv light, with curing resulting from exposure to a wide range of uv light wavelengths. In this particular example, a shorter wavelength of uv light may result in a stronger cure as a result of the greater photon energy that is associated with a shorter wavelength ($\lambda$) of light as given by the equation $E=h*c/\lambda$, where E=photon energy, h=Plank's constant, c=velocity of light, and k=wavelength.

Discussion of Possible Embodiments

The following are non-exclusive descriptions of possible embodiments of the present invention.

A magnetic ink compound according to an exemplary embodiment of this disclosure, among other possible things, includes a photopolymer resin base; and a magnetic material powder.

The magnetic ink compound of the preceding paragraph can optionally include, additionally and/or alternatively, any one or more of the following features, configurations and/or additional components:

A further embodiment of the foregoing magnetic ink compound, wherein the photopolymer resin base is heat curable.

A further embodiment of the foregoing magnetic ink compound, wherein the magnetic material powder comprises between 10% and 85% by volume of the magnetic ink compound.

A further embodiment of the foregoing magnetic ink compound, wherein the magnetic material powder comprises approximately 45% by volume of the magnetic ink compound.

A further embodiment of the foregoing magnetic ink compound, wherein the magnetic material powder is an alloy comprised of neodymium, iron, and boron.

A further embodiment of the foregoing magnetic ink compound, wherein the magnetic material powder is comprised of particles of the alloy, wherein the particles have an average mean diameter between 1 µm and 30 µm.

An additive manufacturing direct writing method of producing a magnetic pattern on a substrate comprising the foregoing magnetic ink compound, further comprising the steps of: (a) extruding a plurality of filaments of the magnetic ink compound through a nozzle on to the substrate, each of the filaments having a filament width and filament length, wherein there is a relative motion between the nozzle and the target substrate and wherein the filament length is at least as great as the filament width; (b) soft-curing the first and second filaments of magnetic ink compound; repeating steps (a) and (b) to extrude and soft-cure multiple additional filaments of magnetic ink compound above the first and second filaments of magnetic ink compound to produce the magnetic pattern; and post-curing the magnetic pattern.

The additive manufacturing direct writing method of the preceding paragraph can optionally include, additionally and/or alternatively, any one or more of the following features, configurations and/or additional components:

A further embodiment of the foregoing additive manufacturing direct writing method, wherein the first filament width is between 50 µm and 500 µm.

A further embodiment of the foregoing additive manufacturing direct writing method, wherein the soft-curing further comprises the step of exposing the layer to a first light exposure.

A further embodiment of the foregoing additive manufacturing direct writing method, wherein the first light exposure has a wavelength between 100 nm and 425 nm.

A further embodiment of the foregoing additive manufacturing direct writing method, wherein the first light exposure has a wavelength of approximately 365 nm.

A further embodiment of the foregoing additive manufacturing direct writing method, wherein the first light exposure has a wavelength of approximately 405 nm.

A further embodiment of the foregoing additive manufacturing direct writing method, wherein the post-curing further comprises the step of exposing the magnet to a second light exposure and an elevated temperature.

A further embodiment of the foregoing additive manufacturing direct writing method, wherein the second light exposure has a wavelength between 100 nm and 425 nm.

A further embodiment of the foregoing additive manufacturing direct writing method, wherein the second light exposure has a wavelength of approximately 365 nm.

A further embodiment of the foregoing additive manufacturing direct writing method, wherein the second light exposure has a wavelength of approximately 405 nm.

A further embodiment of the foregoing additive manufacturing direct writing method, wherein the elevated temperature is between 55° C. and 85° C.

A further embodiment of the foregoing additive manufacturing direct writing method, wherein the elevated temperature is approximately 70° C.

A method of direct-writing a magnet comprising the foregoing magnetic ink compound, further comprising the steps of: (a) extruding a first filament having a first filament width of the magnetic ink compound through a nozzle on to a target substrate, wherein there is a relative motion between the nozzle and the target substrate; (b) extruding a second filament having a second filament width of the magnetic ink compound through a nozzle on to a target substrate; wherein the second filament width is approximately equal to the first filament width; and the first filament and the at least one second filament comprise a layer; (c) soft-curing the layer; repeating steps (a), (b), and (c) to extrude and soft-cure multiple layers to produce the magnet; and post-curing the magnet.

A further embodiment of the foregoing method of direct-writing a magnet, further comprising the step of post-curing the magnet by exposing the magnet to an elevated temperature, wherein the elevated temperature is greater than 55° C.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A magnetic ink compound, comprising:
a photopolymer resin base; and
a magnetic material powder;
wherein the photopolymer resin base is heat curable.

2. The magnetic ink compound of claim 1, wherein the magnetic material powder comprises between 10% and 85% by volume of the magnetic ink compound.

3. The magnetic ink compound of claim 1, wherein the magnetic material powder comprises approximately 45% by volume of the magnetic ink compound.

4. The magnetic ink compound of claim 1, wherein the magnetic material powder is an alloy comprised of neodymium, iron, and boron.

5. The magnetic ink compound of claim 4, wherein the magnetic material powder is comprised of particles of the alloy, wherein the particles have an average mean diameter between 1 µm and 30 µm.

6. An additive manufacturing direct writing method of producing a magnetic pattern on a substrate comprising the magnetic ink compound of claim 1, further comprising the steps of:
(a) extruding a plurality of filaments of the magnetic ink compound through a nozzle on to the substrate, each of the filaments having a filament width and filament length, wherein there is a relative motion between the nozzle and the target substrate and wherein the filament length is at least as great as the filament width;

(b) soft-curing the first and second filaments of magnetic ink compound;
repeating steps (a) and (b) to extrude and soft-cure multiple additional filaments of magnetic ink compound above the first and second filaments of magnetic ink compound to produce the magnetic pattern; and
(c) post-curing the magnetic pattern, wherein the post-curing further comprises the step of exposing the magnetic pattern to an elevated temperature.

7. The additive manufacturing direct writing method of claim 6, wherein the first filament width is between 50 μm and 500 μm.

8. The additive manufacturing direct writing method of claim 6, wherein the soft-curing further comprises the step of exposing the layer to a first light exposure.

9. The additive manufacturing direct writing method of claim 8, wherein the first light exposure has a wavelength between 100 nm and 425 nm.

10. The additive manufacturing direct writing method of claim 8, wherein the first light exposure has a wavelength of approximately 365 nm.

11. The additive manufacturing direct writing method of claim 8, wherein the first light exposure has a wavelength of approximately 405 nm.

12. The additive manufacturing direct writing method of claim 7, wherein the post-curing further comprises the step of exposing the magnet to a second light exposure.

13. The additive manufacturing direct writing method of claim 12, wherein the second light exposure has a wavelength between 100 nm and 425 nm.

14. The additive manufacturing direct writing method of claim 12, wherein the second light exposure has a wavelength of approximately 365 nm.

15. The additive manufacturing direct writing method of claim 12, wherein the second light exposure has a wavelength of approximately 405 nm.

16. The additive manufacturing direct writing method of claim 12, wherein the elevated temperature is between 55° C. and 85° C.

17. The additive manufacturing direct writing method of claim 12, wherein the elevated temperature is approximately 70° C.

18. A method of producing a magnet comprising the steps of:
producing a magnetic ink compound, comprising:
a photopolymer resin base; and
a magnetic material powder;
wherein the photopolymer resin base is heat curable; and
direct writing a magnet, further comprising the steps of:
(a) extruding a first filament having a first filament width of the magnetic ink compound through a nozzle on to a target substrate, wherein there is a relative motion between the nozzle and the target substrate;
(b) extruding a second filament having a second filament width of the magnetic ink compound through a nozzle on to a target substrate;
wherein the second filament width is approximately equal to the first filament width; and
the first filament and the at least one second filament comprise a layer;
(c) soft-curing the layer;
repeating steps (a), (b), and (c) to extrude and soft-cure multiple layers to produce the magnet; and
post-curing the magnet by exposing the magnet to an elevated temperature.

19. The method of producing a magnet of claim 18, wherein the elevated temperature is greater than 55° C.

* * * * *